United States Patent
Tremoulet, Jr. et al.

(10) Patent No.: US 6,736,407 B2
(45) Date of Patent: May 18, 2004

(54) STATIC FLUID SEALS AND SEAL ASSEMBLIES FOR ULTRAHIGH PRESSURE FLUID CONTAINMENT

(75) Inventors: Olivier L. Tremoulet, Jr., Edmonds, WA (US); Lennart Svensson, Västerås (SE); Chidambaram Raghavan, Kent, WA (US); Mohamed Hashish, Bellevue, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 10/033,531

(22) Filed: Dec. 27, 2001

(65) Prior Publication Data

US 2003/0122322 A1 Jul. 3, 2003

(51) Int. Cl.⁷ ............................ F16J 15/02; B65D 53/00
(52) U.S. Cl. ...................... 277/638; 277/644; 277/650; 277/910; 220/234; 220/239
(58) Field of Search .................. 277/609, 607, 277/611, 616, 626, 627, 630, 637, 638, 641, 642, 644, 650, 910, 619; 220/233, 234, 239, 240, 318

(56) References Cited

U.S. PATENT DOCUMENTS

| 2,456,356 | A | * | 12/1948 | Aber | 277/584 |
|---|---|---|---|---|---|
| 2,739,855 | A | * | 3/1956 | Bruning | 277/584 |
| 3,144,162 | A | * | 8/1964 | Morris | 220/378 |
| 3,223,427 | A | * | 12/1965 | Gerard et al. | 277/441 |
| 3,419,180 | A | * | 12/1968 | Homrig et al. | 220/235 |
| 3,514,132 | A | * | 5/1970 | Peabody | 285/331 |
| 3,854,735 | A | * | 12/1974 | Maurer et al. | 277/638 |
| 4,192,519 | A | * | 3/1980 | Buggele | 277/638 |
| 4,346,903 | A | * | 8/1982 | Heiermann | 277/452 |
| 4,883,336 | A | * | 11/1989 | Bock et al. | 385/138 |
| 4,936,512 | A | * | 6/1990 | Tremoulet, Jr. | 239/596 |
| 4,982,889 | A | * | 1/1991 | Eardley | 277/579 |
| 6,162,031 | A | * | 12/2000 | Tremoulet, Jr. | 417/569 |

* cited by examiner

*Primary Examiner*—Alison K. Pickard
(74) *Attorney, Agent, or Firm*—Seed IP Law Group PLLC

(57) ABSTRACT

High-pressure static seals and pressure vessels with static seals for containing fluid at high pressures are shown and described. Embodiments of the invention allow a plug to be easily, manually inserted into and removed from the pressure vessel. A metallic ring in the seal is configured to expand under pressure to prevent an O-ring in the seal from being extruded into a gap between the plug and the vessel wall, but not to expand so much as to cause galling or similar damage when the seal moves with respect to the wall under elevated pressure.

3 Claims, 6 Drawing Sheets

STATIC FLUID SEALS AND SEAL ASSEMBLIES FOR ULTRAHIGH PRESSURE FLUID CONTAINMENT

BACKGROUND OF THE INVENTION

1. Field of the Invention

The present invention relates to fluid seals, and in particular, to devices and systems for sealing fluids at very high pressures.

2. Description of the Related Art

Sealing fluids at extremely high pressures, i.e., pressures in excess of 15,000 psi, can be extremely difficult and complicated. FIG. 5 illustrates a high pressure seal according to the prior art. In the illustrated example, a plug 10 is engaged with a cylinder wall 12 having a circular mouth. An exterior surface 14 of the plug 10 is closely conformed to an interior surface 16 of the cylinder wall 12. A circular gap 18 is formed between the plug 10 and the cylinder wall 12. An annular recess 20 is formed in the external surface 14 of the plug 10 at a distal end 22 of the plug.

A metallic ring 24 with a triangular cross-section is positioned within the recess 20 with its right-most edge 26 abutting a complementary angled wall 28 of the recess. The metallic ring 24 is sized to slide with the plug 10 with respect to the internal surface 16 of the cylinder wall 12 when the system is not pressurized. This allows the plug 10 to be inserted and removed from the cylinder wall 12 to provide access to a cavity 30.

A polymeric backup ring 32 (sometimes referred to as a seal) is positioned to the left of the metallic ring 24, as viewed in FIG. 5. An angled, left-most edge 34 of the metallic ring 24 abuts a complementary tapered edge 36 on the polymeric backup ring 32.

An O-ring 38 is positioned on the side of the polymeric backup ring 32 opposite the metallic ring 24. The O-ring 38 is large enough to extend from the recess 20 to the internal surface 16 of the cylinder wall 12. The O-ring 38 seals the cavity 30.

When a fluid in the cavity 30 is pressurized, the O-ring 38 is urged against the polymeric backup ring 32 which, in turn, is urged against the metallic ring 24. The tapered edge 36 of the polymeric backup ring 32 presses against the angled, left-most edge 34 of the metallic ring 24, creating an upward force that urges the metallic ring against the internal surface 16 of the cylinder wall 12. In addition, as the metallic ring 24 is urged toward the right, as viewed in FIG. 5, the wall 28 of the recess 20 also urges the right-most edge 26 of the metallic ring upward against the internal surface 16 of the cylinder wall 12. In addition, the pressurized fluid operates on the left-most edge 34 of the metallic ring 24, adding to the force urging the metallic ring against the internal surface 16 of the cylinder wall 12.

As a result of the combined forces described above, the metallic ring 24 is urged against the internal surface 16 of the cylinder wall 12 with a very high force. As a result, the force the metallic ring 24 exerts on the internal surface 16 is so great that relative movement between the two galls and scratches one or both of the contacting surfaces.

When the fluid in the cavity 30 is pressurized to extremely high pressures (i.e., over 15,000 psi), or more so when the fluid is pressurized to even greater pressures (e.g., over 75,000 psi or over 100,000 psi), the cylinder wall 12 expands outward and the plug 10 compresses toward the right as viewed in FIG. 5. The expansion and movement of these parts results in relative movement between the metallic ring 24 and the internal surface 16 of the cylinder wall 12. Every time the pressure in the cavity 30 is cycled, the metallic ring 24 expands and contracts, further galling and scratching either the metallic ring and/or the cylinder wall 12. Eventually, scratches or other damage allows fluid to escape from the cavity 30, ultimately resulting in seal failure. In addition, it has been recorded that after a number of cycles, the metallic ring 24 can become lodged against the cylinder wall 12, requiring further repair and replacement of parts of the system.

Attempts have been made to coat the metallic ring 24 with materials that prevent or delay damage. It has been found, however, that such coatings are only temporary and, ultimately, the metallic ring 24 again fails, as described above.

BRIEF SUMMARY OF THE INVENTION

The present invention is directed toward seals and seal systems for use with high pressure fluid containment systems. Embodiments of the invention allow a plug or other closure to be easily, manually engaged with and disengaged from a pressure vessel, while affecting a fluid seal at extreme elevated pressures. Embodiments of the invention will not scratch or gall the seal or the internal surface of the pressure vessel, and will not become lodged within the pressure vessel, as were commonly experienced with prior art seals.

One embodiment of the present invention incorporates a metallic ring having inner and outer surfaces. The inner surface is adapted to be received within a recess in a plug or other closure, and the outer surface is adapted to closely conform with an internal surface of a mouth on a pressure vessel. The maximum unstressed diameter of the metallic ring is equal to or slightly less than the diameter of the mouth to allow the closure to be manually inserted into and removed from the mouth when fluid in the pressure vessel is not pressurized. An edge on the metallic ring is adapted to sealingly conform to a complementary edge on the recess when the seal is subject to an elevated pressure. The metallic ring is made from a material having a modulus of elasticity that is sufficiently low such that, when the fluid is pressurized, the fluid pressure expands the metallic ring against the wall of the pressure vessel with a force sufficient to prevent extrusion of an O-ring. At the same time, however, the modulus of elasticity of the material of the metallic ring is small enough such that the force between the metallic ring and the wall is insufficient to generate a shear load great enough to gall the metallic ring when the metal ring moves with respect to the wall.

In another embodiment of the present invention, the seal incorporates a metallic ring having an inner surface, an outer surface, and an edge similar to those described above. In this embodiment, however, the metallic ring has a specific width that is selected to provide a desired pressure area. The width corresponds to the portion of the outer surface that contacts the wall of the pressure vessel. In the present invention, the width is large enough such that, when the fluid is pressurized, the metallic ring expands against the wall of the mouth with a force sufficient to prevent O-ring extrusion. At the same time, however, the width is small enough such that the force is insufficient to generate a shear load great enough to gall the metallic ring when the metallic ring moves with respect to the internal surface.

In another embodiment of the present invention, the metallic ring incorporates a first ring and a second ring. The first ring can be configured according to either of the above embodiments. The second ring is spaced apart from the first ring and is configured to retain at least one O-ring in the space between the first and second rings. In some alternate embodiments of this invention, the first and second rings are connected by an elongated neck of metallic material. The length and thickness of the neck are selected such that the mass of the second ring does not adversely affect the performance of the first ring.

The present invention is also directed toward pressure vessels incorporating the above-described seals.

DETAILED DESCRIPTION OF THE INVENTION

The present invention is directed toward seals and sealing systems for high-pressure fluid containment vessels. Many specific details of certain embodiments of the invention are set forth in the following description and illustrated in FIGS. 1–4 and 6 to provide a thorough understanding of such embodiments. One skilled in the art, however, will understand that the present invention may have additional embodiments, or may be practiced without several of the details described in the following description.

Figure 1:
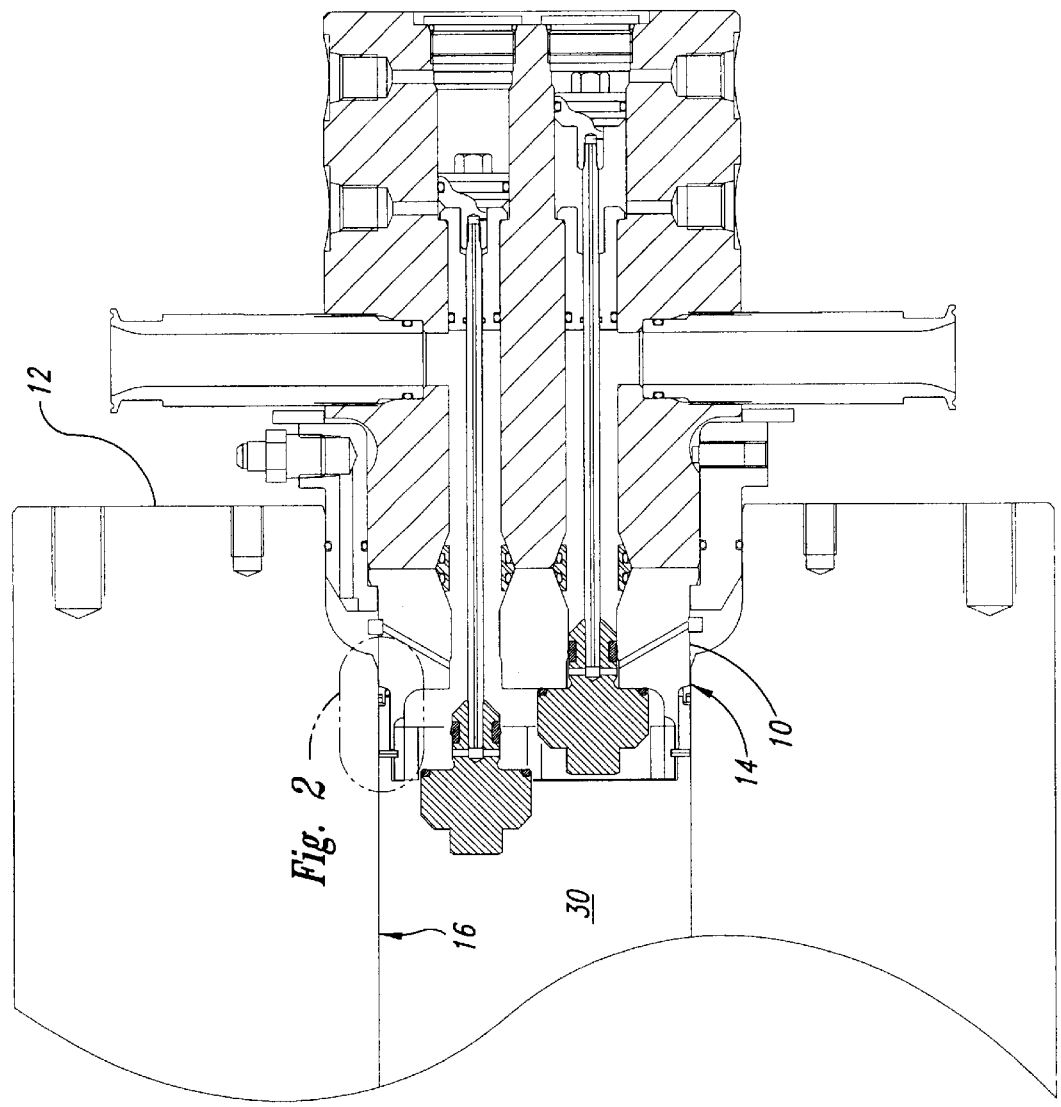
FIG. 1 is a diametric cross section of a portion of a pressure vessel and a plug therefor incorporating a seal according to an embodiment of the present invention.

FIG. 1 illustrates a plug 10 and a cylinder wall 12 for a vessel used to contain high-pressure fluids. The applicant notes that the seal of the present invention can be used in a variety of configurations, and that the configuration illustrated in FIG. 1 is merely one example thereof. Applicant believes, however, that the following description and enclosed figures are sufficiently specific to allow one of ordinary skill in the art to appreciate variations that can be made from the illustrated embodiment.

Figure 2:
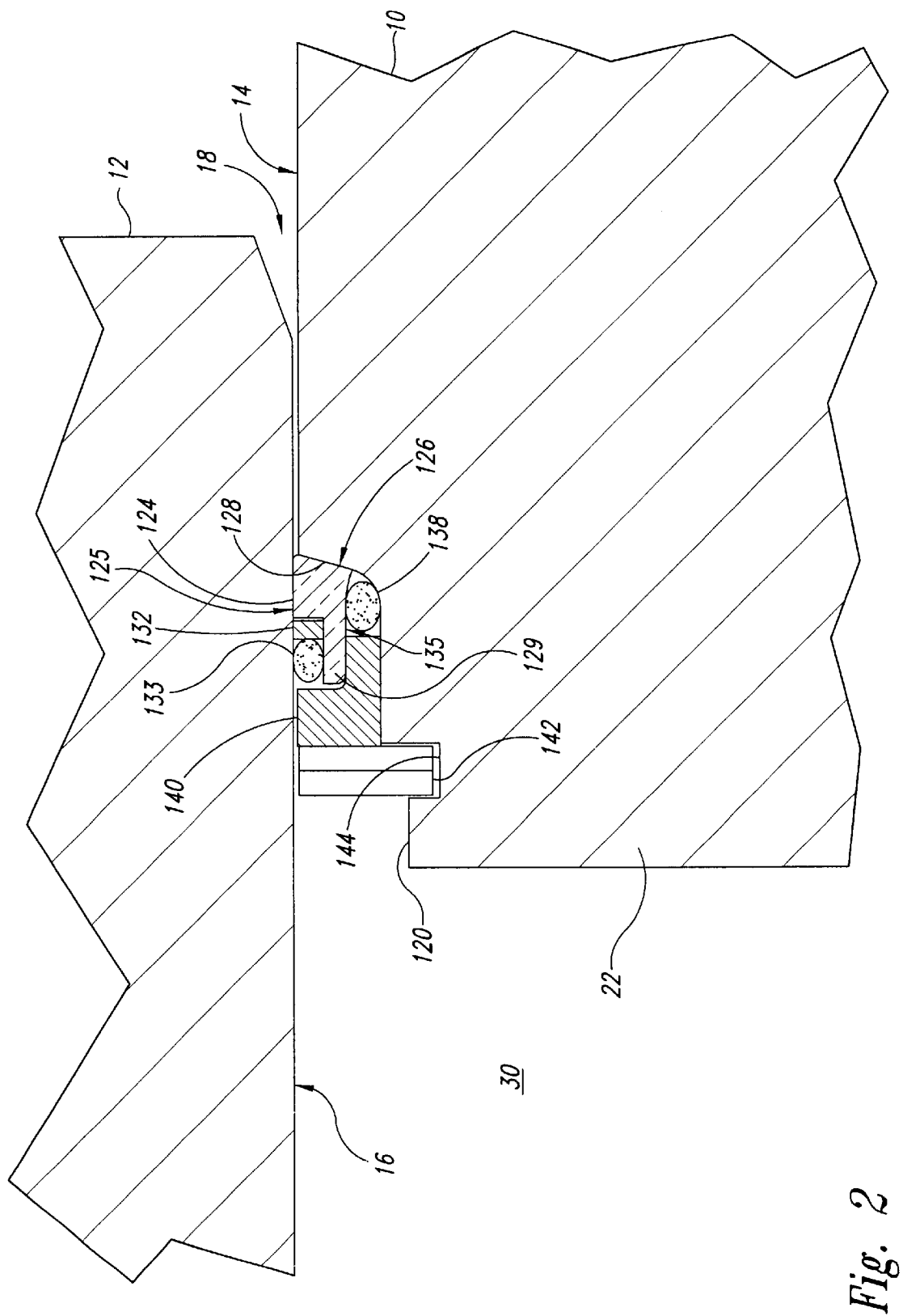
FIG. 2 is an enlarged cross section of the pressure vessel, plug and seal of FIG. 1, as defined in FIG. 1.

FIG. 2 is an enlarged view of a portion of the plug 10 and cylinder wall 12 illustrated in FIG. 1. Near the distal end 22 of the plug 10, a complex annular recess 120 is formed in the perimeter of the plug. A distal end of the recess 120 is open into the cavity 30, while a proximal end of the recess terminates in a sidewall 128. A metallic ring 124 is positioned against the sidewall 128 of the recess 120. In the illustrated embodiment, the metallic ring 124 is an aluminum-bronze material of unitary construction. The applicant appreciates that the exact material of the metallic ring 124 can be varied as will be appreciated by one of ordinary skill in the art after reviewing the following disclosure. An outer surface 125 on the metallic ring 124 is sized and shaped to closely conform to the internal surface 16 of the cylinder wall 12. Thus, because cylinder wall 12 is, by definition, cylindrical, outer surface 125 of the illustrated embodiment is likewise cylindrical. In the illustrated embodiment, the outer surface 125 of the metallic seal 124 contacts the internal surface 16, without exerting any significant force on the internal surface. As a result, the metallic seal 124 can be slid with the plug 10 into and out of the pressure vessel manually.

A right-most edge 126 of the metallic seal 124 is shaped to closely conform to the sidewall 128 of the recess 120. The angle of the two surfaces can be close enough to vertical, as viewed in FIG. 2, to prevent the metallic ring 124 from sliding with respect to the plug 10 when the pressure in the cavity 38 increases. The right-most edge 126 and the sidewall 128 can be processed to sealingly mate when the fluid in the cavity 30 is under pressure.

A neck 129 projects from the metallic ring 124 in a direction toward the extreme distal end 22 of the plug 10. The neck 129 is radially spaced from the outer surface 125 to allow a backup ring 132 and an outer O-ring 133 to be positioned between the neck 129 and the internal surface 16 of the cylinder wall 12. An inner surface 135 of the metallic ring 124 can be spaced apart from the recess 120 to allow an inner O-ring 138 to be positioned between the metallic ring 124 and the recess 120. As illustrated in FIG. 2, the inner surface 135 can be flared to intersect the sidewall 128 at a substantially perpendicular angle. The inventors appreciate that the metallic ring 124 can be fabricated without the neck 129 without deviating from the spirit of the invention.

A retention ring 140 can be positioned distally on the plug with respect to the metallic ring 124, the backup ring 132, the outer O-ring 133 and the inner O-ring 138, to retain each of these elements in their desired configuration. A locking ring 142 can be retained within a locking channel 144 to prevent all of the above seal elements from moving out of the recess 120 when the plug 10 is withdrawn from the cylinder wall 12.

The material selected for the metallic ring 124 has a modulus of elasticity sufficiently low such that, when the pressure in the cavity 30 rises and the internal surface 16 of the cylinder wall 12 moves outward, the metallic ring can expand due to the fluid pressure on the inner surface 135. The modulus of elasticity of the material of the metal ring 124 is low enough, however, such that the force exerted by the metallic ring on the internal surface 16 is not sufficiently large to damage either the metallic ring or the cylinder wall 12 when the metallic ring moves with respect to the cylinder wall. The maximum modulus of elasticity thus corresponds to a shear force sufficient to gall the material of the metallic ring 124. So long as the shear force is below this threshold, movement of the metallic ring 124 with respect to the internal surface 16 will not result in galling of the metallic ring.

The low range of the modulus of elasticity is based on the amount of expansion required for the metallic ring 124 to maintain contact with the internal surface 16 of the cylinder wall 12 as the cylinder wall expands under pressure, and to exert a force on the wall sufficient to prevent O-ring extrusion. In the illustrated embodiment, the modulus of elasticity of the material of the metallic ring 124 is between 5 million and 30 million psi, inclusive. In particular, the material of the metallic ring 124 is bronze sold under the brand Ampco M-4. The modulus of elasticity of this material is roughly one-half that of stainless steel, which is what the illustrated cylinder wall 12 is made from. In alternate embodiments, the metallic ring 124 can be made from Aluminum Bronze 632 or other suitable materials.

During pressurization of the fluid in the cavity 30, the metallic ring 124 is forced against the sidewall 128 of the recess 120, and at the same time, is forced against the internal surface 16 of the cylinder wall. The only paths through which pressurized fluid can leak are between the metallic ring 124 and the sidewall 128 of the recess, or between the metallic ring and the internal surface 16 of the cylinder wall. In the first instance, the inner O-ring 138 prevents the passage of pressurized fluid, and in the latter instance, the outer O-ring 133 prevents the passage of pressurized fluid.

The inner and outer O-rings 138/133 effectively resist the increasing pressure within the cavity 30 so long as there is no gap between the metallic ring 124 and both the internal surface 16 and the sidewall 128 of the recess 120. As the pressure in the cavity 30 increases substantially, however, the internal surface 16, with the cylinder wall 12, expands away from the plug 10. As a result, the size of the gap 18 between the plug 10 and the cylinder wall 12 increases. Rigid seals according to the prior art would allow the O-rings to be extruded into the increasing gap and, once the pressure decreases, become pinched and cut between the compressing cylinder wall and the plug. Eventually, the O-ring would fail as a result of the repeated cuts caused by the cycling of the pressure in the cavity 30. On the other hand, highly elastic rings would expand with too much force, resulting in galling as the materials expand and contract, as discussed above.

Embodiments of the present invention prevent the O-ring from being cut, as the metallic ring 124 expands with the cylinder wall 12 with a sufficient force to prevent the O-ring from being extruded between the metallic ring 24 and the internal surface 16. The metallic ring 124 remains in constant contact with the internal surface 16 of the cylinder wall 12. At the same time, however, the metallic ring 124 exerts a force on the internal surface 16 that is not strong enough to gall the material.

Figure 6:
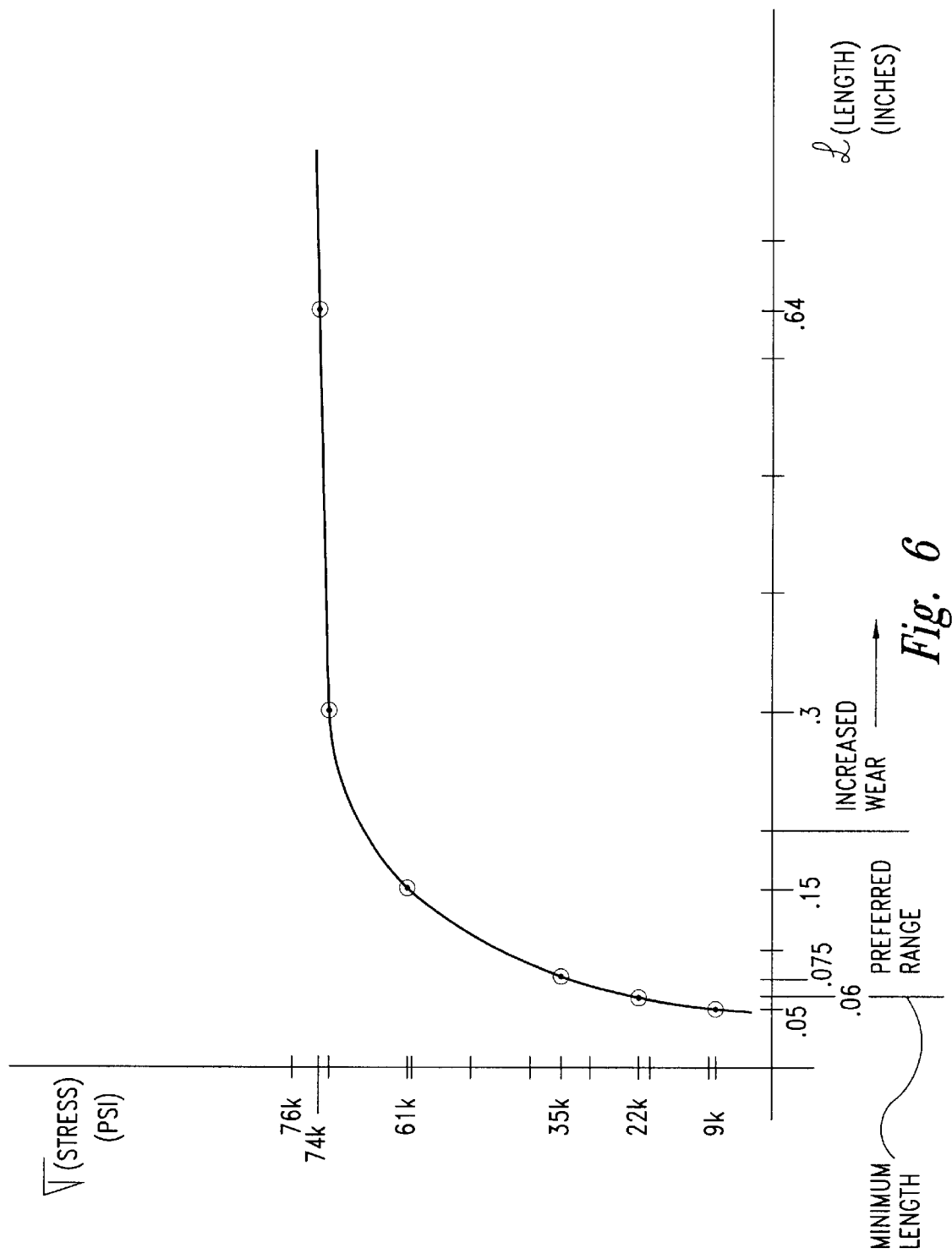
FIG. 6 is a graph illustrating the relationship between the operable width of a metallic ring according to one embodiment of the invention, on one axis, and the stress exerted on the vessel wall by such a ring, on the other axis.

One experimental example is illustrated in FIG. 6. The optimal range for the length (dimension "a" in FIGS. 3 and 4) for an aluminum bronze metallic ring having a diameter of approximately 6.0 inches is between 0.06 inches and 0.20 inches. Although a larger length would work, the longer the length the greater the wear between the parts for different materials and for rings of different diameters, this range may vary, as one of ordinary skill in the art would appreciate after reviewing this disclosure.

Embodiments of the present invention have numerous advantages over the prior art. For example, embodiments of the seal according to the present invention minimize or eliminate fretting and galling of the metallic ring and with the pressure vessel bore. In addition, because there is no fretting or galling, and because the metallic ring will not lodge against the cylinder wall, embodiments of the present invention allow the plug to be manually, easily inserted into and removed from the pressure vessel.

Embodiments of the present invention provide a thorough fluid seal at extremely high pressures, while at the same time exerting little or no force on the cylinder wall after the pressure has been removed. The metallic ring is able to slide axially along the cylinder wall without damaging the cylinder wall or being itself damaged thereby. As a result, the useful life of the metallic ring of the present invention is substantially longer and provides substantially more benefits during its useful life than seals of the prior art.

Figure 3:
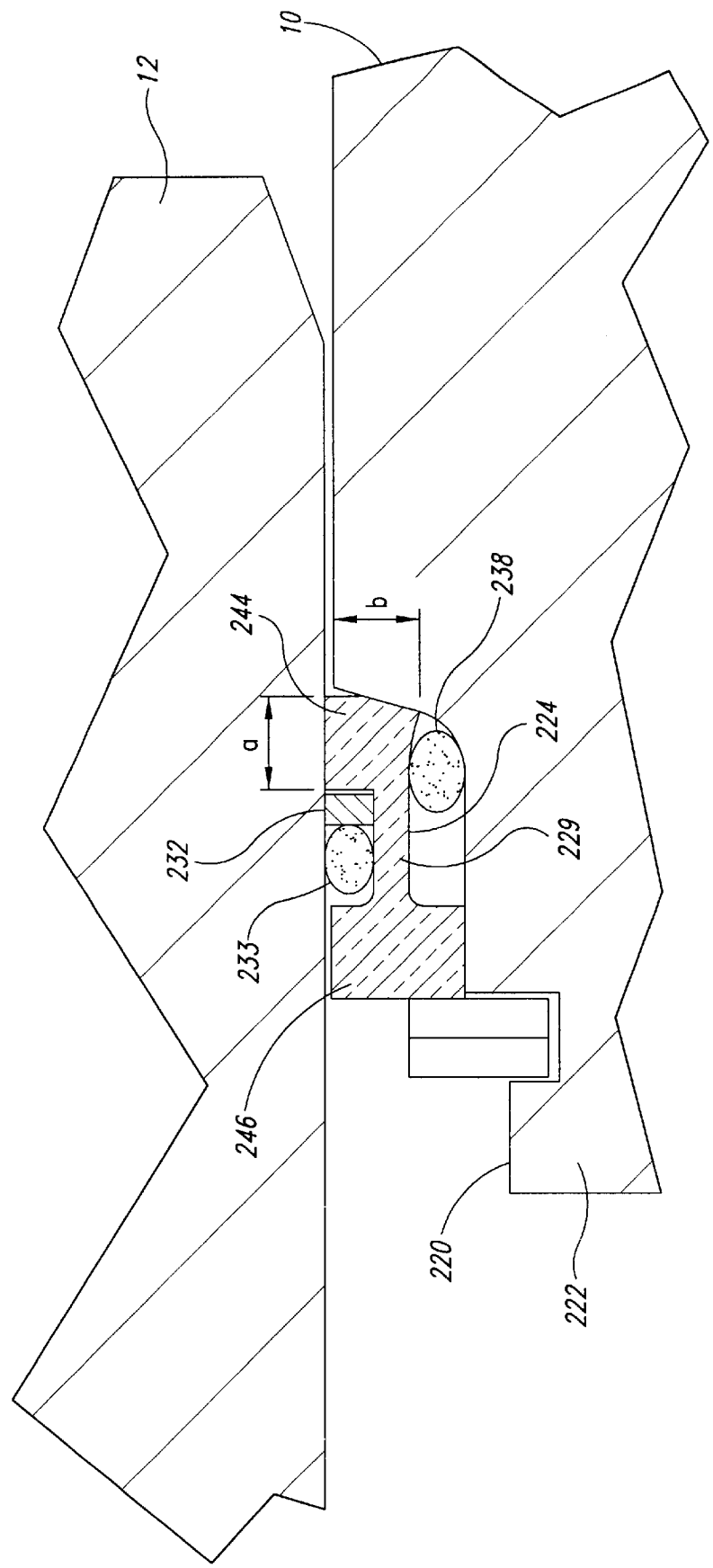
FIG. 3 is a cross-sectional view of a portion of a pressure vessel and plug, and a seal assembly according to an alternate embodiment of the present invention.

FIG. 3 illustrates one possible alternate embodiment of the present invention. The plug 10 of FIG. 3 has a complex recess 220 at its distal end 222. Within the recess 220, a metallic ring 224 is positioned, along with inner and outer O-rings 238/233, and a backup ring 232. The unitary metallic ring 224 is shaped to retain the inner and outer O-rings 238/233 and the backup ring 232 in their proper respective positions during use as well as during insertion and removal.

The metallic ring 224 of the present embodiment has a sealing portion 244 and a retention portion 246 spaced from the sealing portion. A neck 229 extends between the sealing portion 244 and the retention portion 246. The sealing portion has a width "a" and a thickness "b". The width "a" is designed to create a desired expansion force, as explained above. The greater the width "a", the greater the outward force exerted by the pressurized fluid against the sealing portion 244 of the metallic ring 224. It is notable that the pressurized fluid exerts a force on opposing sides of the neck 229, and consequently does not generate any resultant outward force against the sealing portion of the metallic ring. Thus, the width "a" exclusively affects the force the sealing portion 244 of the metallic ring 224 exerts on the cylinder wall 12.

The neck 229 is sufficiently thin to not significantly adversely affect the expansion of the sealing portion 244 of the metallic ring 224. As a result, any resistance or expansion caused by the retention portion 246 is not transferred through the neck 229 to the sealing portion 244. Likewise, any expansion by the sealing portion 244 is not resisted to any significant extent by the neck 229.

The one-piece metallic ring 224 of this embodiment allows for a simpler assembly due to the use of fewer structural elements. At the same time, as discussed immediately above, the metallic ring 224 of this embodiment can provide all of the advantages discussed in connection with the first embodiment of the present invention.

Figure 4:
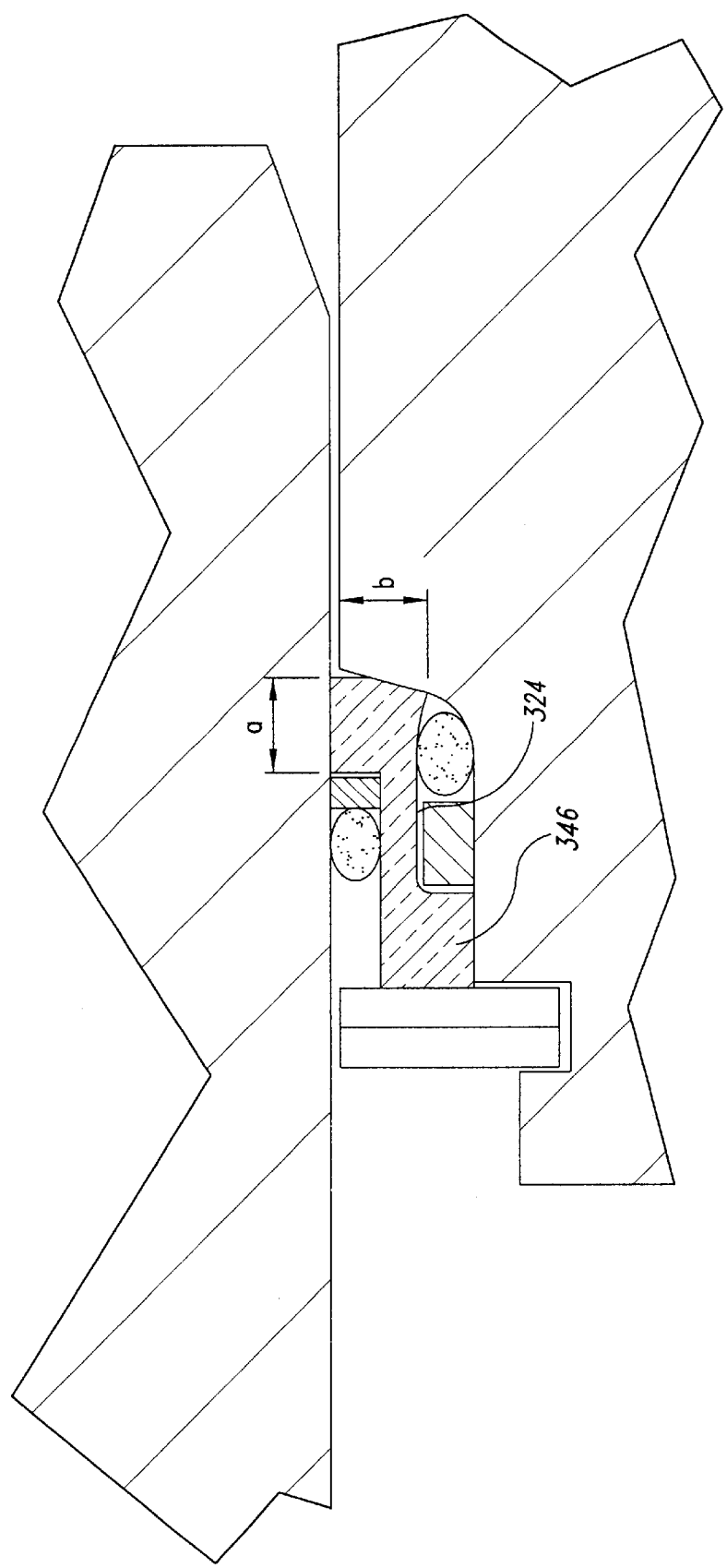
FIG. 4 is a cross-sectional view of a portion of a pressure vessel and plug, and a seal assembly according to yet another alternate embodiment of the present invention.
Figure 5:
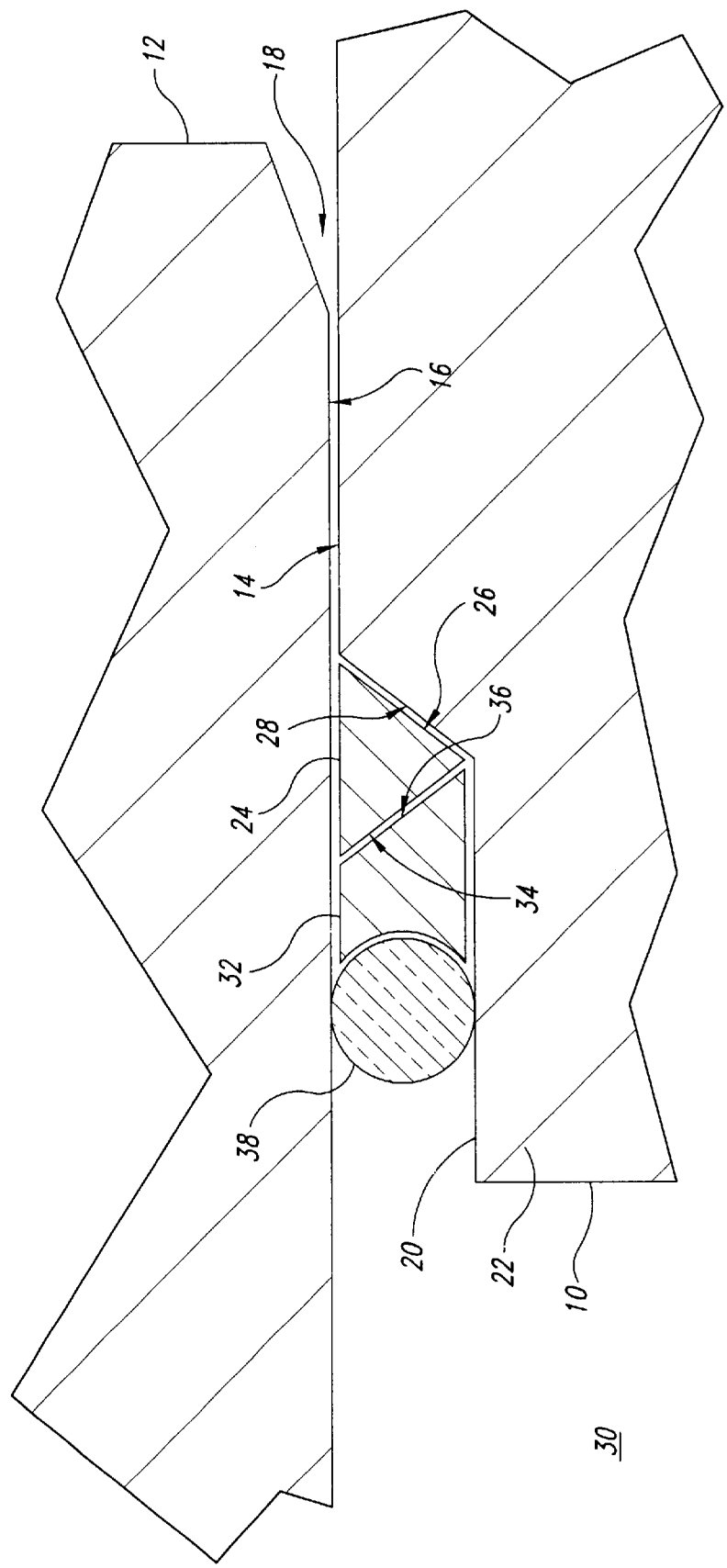
FIG. 5 is a cross-sectional view of a portion of a pressure vessel and plug, and a sealing assembly according to the prior art.

FIG. 4 illustrates yet another embodiment of the present invention. In FIG. 4, the metallic ring 324 has a retention portion 346. The retention portion 346, however, is configured to retain only one of the O-rings, as opposed to both O-rings as illustrated in FIG. 3. It is appreciated that the retention portion 346 could similarly be configured to retain only the outer-most O-ring as opposed to the inner-most O-ring as illustrated in FIG. 4.

These and other variations can be made, as one with ordinary skill in the art would appreciate based on reviewing the above disclosure and the enclosed figures. Therefore, it will be appreciate that, although specific embodiments of the invention have been described herein for purpose of illustration, various modifications may be made without deviating from the spirit and scope of the invention. Accordingly, the invention is not limited except by the appended claims.

What is claimed is:

1. A static seal for a pressure vessel designed to retain a fluid pressurized to at least 15,000 psi, the pressure vessel having a wall with an internal surface and terminating at an access location in a circular mouth, and having a plug removably engaged with the pressure vessel to provide access to a cavity inside the pressure vessel, the plug having an engagement portion that is closely conformed to the internal surface, the engagement portion having a recess therein, the seal comprising:

a first ring of metallic material having an inner surface adapted to be received within the recess in the engagement portion of the plug, an outer surface having a width adapted to closely conform with the internal surface of the mouth, the first ring having a maximum unstressed diameter at the outer surface not more than a diameter of the mouth such that the plug and seal can be easily, manually inserted into and removed from the mouth when the fluid is not pressurized, and an edge adapted to conform to a complementary edge on the recess when the seal is subject to an elevated pressure, a second ring spaced apart from the first ring for being positioned on the plug distally of the first ring, the second ring having an outer surface with a maximum unstressed diameter less than that of the first ring, and an inner diameter adapted to be closely received within the recess, such that the second ring can retain an O-ring in the recess between the first and second rings;

wherein the width of the outer surface of the first ring is large enough such that, when the fluid is pressurized, the metallic ring expands against the wall of the mouth with a force sufficient to prevent an O-ring from being extruded into the gap, but small enough such that the force is insufficient to generate a shear load great enough to gall the metallic ring when the metallic ring moves with respect to the internal surface; and wherein the first and second rings collectively form a compound ring of unitary construction, the first and second rings being connected by a neck of material, the neck being sufficiently thin and long as to not significantly affect the elasticity ratio of the first ring.

2. A static seal for a pressure vessel designed to retain a fluid pressurized to at least 15,000 psi, the pressure vessel having a wall with an internal surface and terminating at an access location in a circular mouth, and having a plug removably engaged with the pressure vessel to provide access to a cavity inside the pressure vessel, the plug having an engagement portion that is closely conformed to the internal surface, the engagement portion having a recess therein, the seal comprising:

a first ring of metallic material having an inner surface adapted to be received within the recess in the engagement portion of the plug, an outer surface having a width adapted to closely conform with the internal surface of the mouth, the first ring having a maximum unstressed diameter at the outer surface not more than a diameter of the mouth such that the plug and seal can be easily, manually inserted into and removed from the mouth when the fluid is not pressurized, and an edge adapted to conform to a complementary edge on the recess when the seal is subject to an elevated pressure, a second ring spaced apart from the first ring for being positioned on the plug distally of the first ring, the second ring having an outer surface with a maximum unstressed diameter less than that of the first ring, and an inner diameter adapted to be closely received within the recess, such that the second ring can retain an O-ring in the recess between the first and second rings;

wherein the width of the outer surface of the first ring is large enough such that, when the fluid is pressurized, the metallic ring expands against the wall of the mouth with a force sufficient to prevent an O-ring from being extruded into the gap, but small enough such that the force is insufficient to generate a shear load great enough to gall the metallic ring when the metallic ring moves with respect to the internal surface; and wherein the first and second rings collectively form a compound ring of unitary construction, the first and second rings being connected by a neck of material, the neck being sufficiently thin and long as to not significantly affect the elasticity ratio of the first ring, the inner surface of the first ring being spaced apart from the recess to allow an O-ring to be positioned between the first ring and the recess to facilitate sealing, the second ring being adapted to retain an O-ring between the first ring and the recess.

3. A static seal for a pressure vessel designed to retain a fluid pressurized to at least 15,000 psi, the pressure vessel having a wall with an internal surface and terminating at an access location in a circular mouth, and having a plug removably engaged with the pressure vessel to provide access to a cavity inside the pressure vessel, the plug having an engagement portion that is closely conformed to the internal surface, the engagement portion having a recess therein, the seal comprising:

a first ring of metallic material having an inner surface adapted to be received within the recess in the engagement portion of the plug, an outer surface having a width adapted to closely conform with the internal surface of the mouth, the first ring having a maximum unstressed diameter at the outer surface not more than a diameter of the mouth such that the plug and seal can be easily, manually inserted into and removed from the mouth when the fluid is not pressurized, and an edge adapted to conform to a complementary edge on the recess when the seal is subject to an elevated pressure, a second ring spaced apart from the first ring for being positioned on the plug distally of the first ring, the second ring having an outer surface with a maximum unstressed diameter less than that of the first ring, and an inner diameter adapted to be closely received within the recess, such that the second ring can retain an O-ring in the recess between the first and second rings;

wherein the width of the outer surface of the first ring is large enough such that, when the fluid is pressurized, the metallic ring expands against the wall of the mouth with a force sufficient to prevent an O-ring from being extruded into the gap, but small enough such that the force is insufficient to generate a shear load great enough to gall the metallic ring when the metallic ring moves with respect to the internal surface; and wherein the first and second rings collectively form a compound ring of unitary construction, the first and second rings being connected by a neck of material, the neck being sufficiently thin and long as to not significantly affect the elasticity ratio of the first ring, the inner surface of the first ring being spaced apart from the recess to allow an O-ring to be positioned between the first ring and the recess to facilitate sealing, the second ring being adapted to retain the O-ring between the first ring and the recess and to retain a second O-ring between the neck and the internal surface of the mouth.

* * * * *